United States Patent [19]

Wright

[11] 4,076,167
[45] Feb. 28, 1978

[54] ULTRASONIC DIP SOLDERING PROCESS

[75] Inventor: William E. Wright, East Syracuse, N.Y.

[73] Assignee: Carrier Corporation, Syracuse, N.Y.

[21] Appl. No.: 701,299

[22] Filed: Jun. 30, 1976

[51] Int. Cl.² .............................................. B23K 3/00
[52] U.S. Cl. ........................... 228/173 F; 29/157.3 R; 228/183; 228/259; 228/262
[58] Field of Search ................ 228/57, 183, 259, 262, 228/173 F; 29/157.3 R, 157.4; 72/370; 285/382.4, 382.5

[56] References Cited

U.S. PATENT DOCUMENTS

| 1,931,311 | 10/1933 | Young | 228/215 X |
|---|---|---|---|
| 2,120,067 | 6/1938 | Gray et al. | 285/382.5 X |
| 3,466,738 | 9/1969 | Mount | 285/382.4 X |
| 3,497,946 | 3/1970 | Tingley, Jr. | 285/382.5 X |
| 3,833,986 | 9/1974 | DeCicco | 228/183 X |

Primary Examiner—James L. Jones, Jr.
Assistant Examiner—K. J. Ramsey
Attorney, Agent, or Firm—J. Raymond Curtin

[57] ABSTRACT

Apparatus for venting a plate fin coil during the ultrasonic soldering of aluminum return bend tubes to the heat exchange tubes in the coil. The apparatus includes a process snorkel member comprising a bored plug for telescoping inside an extension tube extending from an open end of a heat exchange tube forming an end of a circuit in the coil, and a venting tube defining an air conduit from the plug to the atmosphere, whereby the pressure in the interior of the plate fin coil assembly is relieved when the fin coil is immersed in the solder bath.

1 Claim, 3 Drawing Figures

ULTRASONIC DIP SOLDERING PROCESS

BACKGROUND OF THE INVENTION

1. Field of the Invention

The present invention relates to the fabrication of plate fin heat exchange coils, and in particular to the ultrasonic soldering of return bends to straight heat exchange tubes to form one or more circuits in a plate fin coil.

2. Description of the Prior Art

A type of heat exchange apparatus widely used in heating and cooling air conditioning systems comprises a plurality of thin-walled straight tubes extending perpendicularly through a large number of parallel thin fins. The tubes are mounted in place by means of rigid end plates parallel with the fins and forming the opposite end walls of the plate fin coil. The tubes are interconnected to form one or more heat exchange fluid circuits. Pairs of tubes are connected at one end by "hair pins" which are generally integral with the straight tubes they connect. Pairs of tubes at the opposite end of the coil are connected by return bends, these being U-shaped tubes compatible with the straight tubes which they connect. In operation, heat exchange fluid such as a refrigerant, flows into an open end of a tube forming the beginning of a heat exchange tube circuit, proceeds through the circuit while heat is transferred between the fluid and the surroundings, and leaves the coil through another open tube forming the other end of the circuit.

The heat exchange tubes used in most plate fin coils are fabricated from aluminum because of the heat transfer and metallurgical characteristics of this material, and because of its low cost relative to other known heat conductors such as copper. Likewise, it has become conventional to fabricate the U-shaped return bends from aluminum tubing both because of the foregoing factors and because of the compatibility of aluminum return bends with aluminum straight tubes.

It is important that the return bends be connected to the respective straight tubes in a strong, fluid-tight manner, to prevent refrigerant or other heat exchange fluid from leaving the heat exchange circuit through any juncture of a return bend and the tubes to which it is connected. Although it is known to attach aluminum return bends to aluminum straight tubes by means of various brazing and conventional soldering techniques, those techniques have in general proven unacceptable. Current methods for connecting aluminum return bends to aluminum tubes involve ultrasonic soldering processes. These processes are particularly advantageous for soldering aluminum materials together, because a major impediment to such operations is the presence of the aluminum oxide coating which forms on raw aluminum surfaces exposed to oxygen as exists in the ambient air. This oxide coating severely hampers the establishment of a good solder joint, and the ultrasonic soldering process has been found to scrub this oxide coating from the aluminum surfaces being bonded, to enable a good solder bond to be effected. U.S. Pat. No. 3,752,381 describes an ultrasonic soldering apparatus useful for performing the bonding operation described herein, and commonly-assigned U.S. Pat. No. 3,760,481 describes an improved process for joining aluminum return bends to heat exchange tubes in plate fin coils. A common process for performing the ultrasonic soldering of aluminum return bends to aluminum heat exchange tubes in plate fin coils comprises the steps of prefitting the return bends into the bell-shaped open ends of the heat exchange tubes being connected, preheating the return bends and the heat exchange tubes in the region to be joined, immersing the prefitted return bends and the ends of the tubes into which they have been inserted into a molten solder bath to equalize the temperature across the area being soldered, applying ultrasonic energy to the molten solder, and withdrawing the plate fin coil from the solder bath to enable the solder to harden and form the desired bond.

In performing the preceding operation, it is extremely important that the air pressure within the tubes and return bends be relieved while the assembly is immersed in the molten solder, for otherwise the air pressure within the tubes and return bends would prevent the molten solder from flowing into the gap between the portion of the return bends inserted into the heat exchange tubes being joined, and the interior surfaces of those tubes opposite the inserted portions of the return bends. One procedure for venting the interior of a plate fin coil circuit to the atmosphere during the ultrasonic soldering process involves providing copper venting tubes soldered to the open ends of the respective circuits in the plate fin coil, these open ends being disposed at the same end of the coil as the return bends. A short extension tube or "stub out" is connected to the open ends of the aluminum heat exchange tubes, and a venting tube or "snorkel" is bonded to the "stub out" with a fluid tight bond and configured such that its open end is exposed to the ambient air when the "stub out" is immersed in the molten solder bath. After the completion of the ultrasonic soldering process, the snorkel tube is cut from the "stub out", and is discarded.

Although the foregoing venting apparatus and process effectively relieves the pressure in the respective circuits during the ultrasonic soldering process, it does suffer serious shortcomings. These snorkel tubes are not reuseable, and copper tubes are expensive items to discard. When the used copper snorkel tube is cut after the ultrasonic soldering process, copper chips occasionally are thrown onto the aluminum coil, and the presence of copper chips on the aluminum surface can result in electrolytic action between the two metals which may ultimately result in a leak in the aluminum tubes. Moreover, the time taken to bond the copper snorkel tube to the open aluminum tubes, and to subsequently cut those snorkel tubes after the soldering process, is very uneconomical, particularly in light of the high volume production of plate fin coils.

SUMMARY OF THE INVENTION

An object of the present invention is to provide an improved apparatus and process for relieving the pressure in the circuits of plate fin coils when portions of the coils are immersed in molten solder during an ultrasonic soldering process for bonding return bends to the heat exchange tubes of the coil.

Another object of the present invention is to provide apparatus of the foregoing type which can be reused in the mass production of plate fin coils.

Still another object of the present invention is to provide apparatus with the foregoing type which avoids the creation of copper chips which could damage aluminum heat exchange tubes.

Yet another object of the present invention is to provide apparatus of the foregoing type which is easy to use and requires no expensive fixtures or related apparatus.

Other objects will be apparent from the description to follow and from the appended claims.

The foregoing objects are achieved by the provision of a venting apparatus for relieving the pressure in the circuits of plate fin coils during the ultrasonic soldering of aluminum return bends to aluminum heat exchange tubes in the coil, the apparatus including a steel plug having a central bore and dimensioned to engage in a fluid-tight manner the interior tubular surface of the free end of a heat exchange tube forming the end of a plate fin coil circuit, or for engaging in a like manner an extension tube or "stub out" fastened to that free end of the heat exchange tube, and further including a venting tube connecting the bore of the plug to the ambient atmosphere. The plug is press-fitted into its receiving tube prior to the immersion of the plate fin coil in the molten solder, and the plug can be removed without difficulty after the soldering operation since the solder is not compatible with the steel plug. This venting apparatus is referred to herein as a "process snorkel."

DETAILED DESCRIPTION OF THE PREFERRED EMBODIMENT

The present invention provides a venting apparatus referred to as a process snorkel for relieving the pressure in the circuits of a plate fin coil during an ultrasonic soldering operation in which a portion of the plate fin coil is immersed in a molten solder bath to effect a solder bond between aluminum return bends and the aluminum tubes to which the return bends are being attached. The process snorkel includes a steel plug having a central bore and an external surface for engaging in a fluid-tight manner an extension tube or "stub out" extending from each open-ended heat exchange tube forming the end of the respective circuits. A tube whose bore is connected to the bore of the plug is configured to vent the circuit to the atmosphere during the immersion process.

Figure 1:
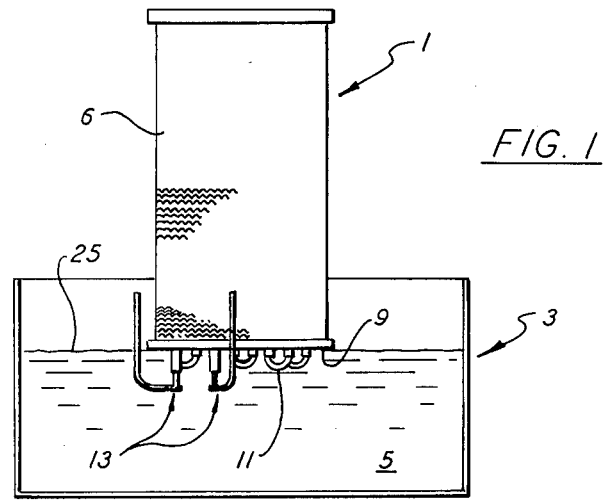
FIG. 1 is a side view of a plate fin coil partially immersed in a tank of molten solder during an ultrasonic soldering process for bonding return bends to heat exchange tubes running through the plate fin coil, the figure further depicting process snorkels according to the invention.
Figure 2:
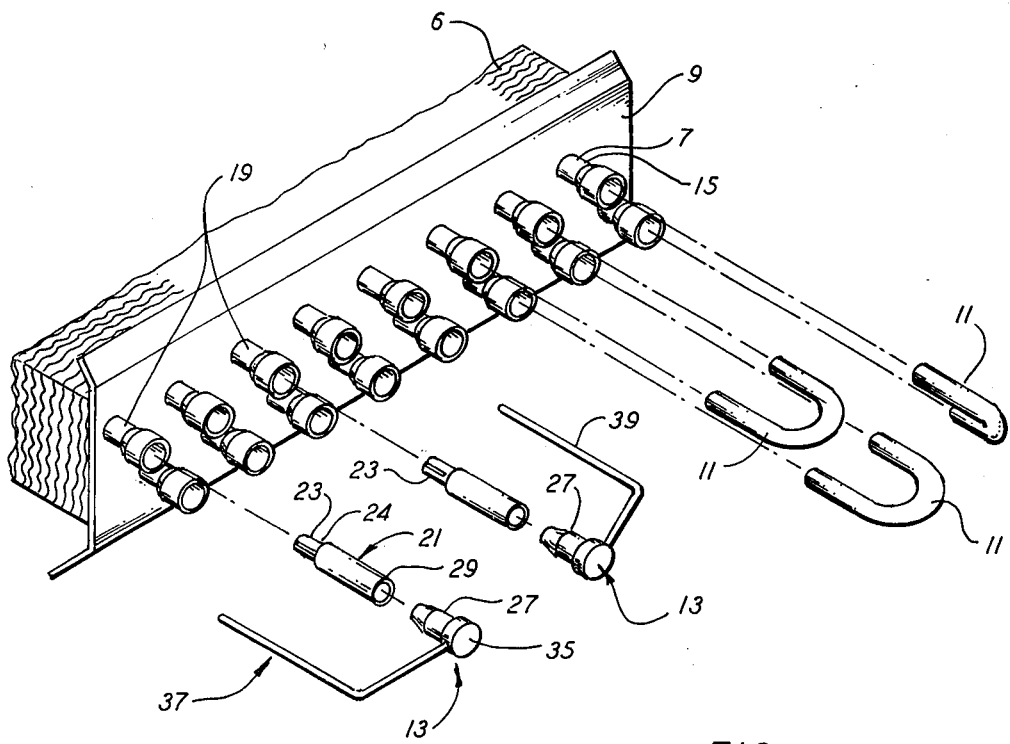
FIG. 2 is an exploded view of a detail of a plate fin coil indicating the manner of assembly of return bends to heat exchange tubes in the plate fin coil, and of process snorkels for insertion into extension tubes pursuant to the invention.

Referring now to FIG. 1, a plate fin coil 1 is illustrated partially immersed in a volume of molten solder 5 (such as zinc solder) disposed an ultrasonic soldering tank 3. An appropriate ultrasonic generator for applying ultrasonic energy to the tank, and appropriate heating means for maintaining the liquidity of the solder, are also provided but are omitted from the drawings for the purpose of clarity. Plate fin coil 1 comprises a large number of thin fins 6 through which extend a plurality of thin, aluminum heat exchange tubes 7 (FIG. 2), and a pair of end plates 9 for supporting the heat exchange tubes. Pairs of tubes 7 are connected together by return bends 11, these return bends being U-shaped aluminum tubes of constant diameter, the span between the legs of the return bends being dimensioned according to the distance between the pairs of tubes to be connected. A pair of process snorkels 13 according to the invention for relieving the air pressure in the circuits of the plate fin coil during the soldering process are also illustrated.

Figure 3:
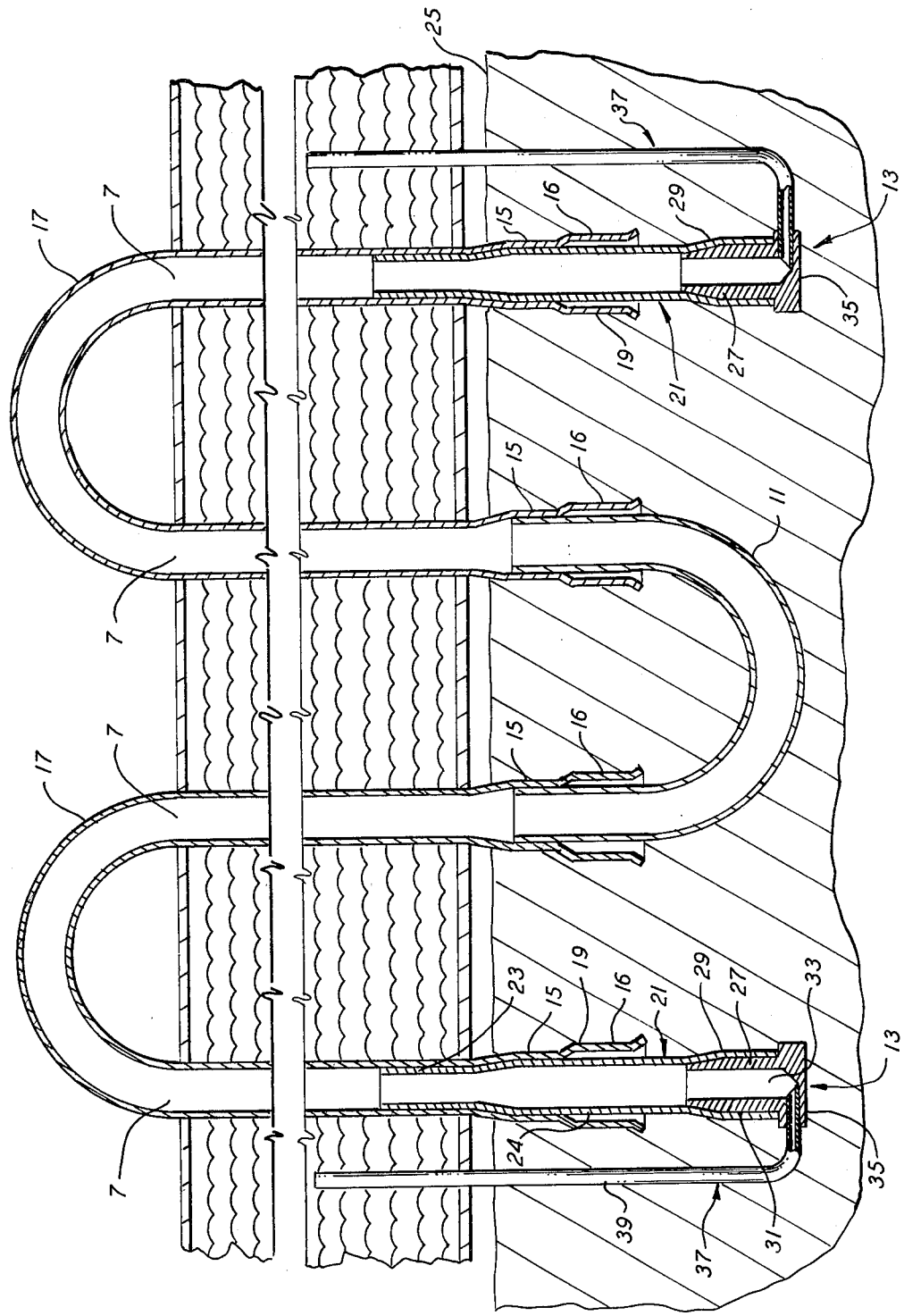
FIG. 3 is a detailed, cross-sectional, partially cutaway view of a plate fin coil assembly during an ultrasonic soldering process for bonding return bends to the heat exchange tubes, and showing in detail process snorkels according to the invention.

The ends of tubes 7 to which return bends 11 are to be bonded are bell shaped and have a first expanded portion 15 whose inner diameter is dimensioned to receive the end portions of the legs of return bends 11 in a telescoping manner, albeit by means of a press-fit, and a second expanded portion 16 having a larger inner diameter dimensioned to facilitate the flow of solder around the portion of a return bend inserted therein. The illustrated plate fin coil includes a single circuit, although it is common to incorporate many circuits in this type of heat exchange equipment. The respective tubes 7 are connected by means of hair pins 17 (FIG. 3) at one end of the coil, and by means of return bends 11 at the other end of the coil. Hair pins 17 are shown as being integral with the tubes, and being merely bends in a long tube which forms a pair of tubes 7. The foregoing circuit terminates in open ends of a pair of tubes 7, these ends being designated by the numeral 19. Tube ends 19 form the entrance and exit ports for heat exchange fluid to flow through the circuit when the plate fin coil is connected in a refrigeration system. A pair of copper extension tubes or "stub outs" 21 are provided for the permanent insertion thereof into circuit ends 19. These extension tubes have reduced diameter sections 23 and 24 dimensioned to be press-fit into circuit ends 19, in much the manner as return bends 11 are inserted into tube ends 15. Extension tubes 21 are the transition members for connecting the aluminum circuit tubes 7 of plate fin coil 1 with copper conduits in a refrigeration system.

When return bends 11 are to be ultrasonically soldered to heat exchange tubes 7, plate fin coil 1 is immersed in molten solder bath 5 to an extent such that the level of molten solder is above the telescoping portions of return bends 11 and the bell-shaped portions of heat exchange tubes 7, as indicated by the level 25 of solder 5 in tank 3. Such immersion effects an internal air pressure within the circuit formed by tubes 7 and return bends 11 due to the air entrapped therein, unless provision is made for relieving that air pressure. In order to obtain such pressure relief, process snorkels 13 are provided.

Each process snorkel 13 comprises a steel plug 27, the plugs having outer configurations dimensioned to be press-fit in a telescoping manner into expanded end portions 29 of extension tubes 21. As shown most clearly in FIG. 3, the interface 31 of the outer surface of plug 27 and the inner surface of plug 27 is continuous over the telescoping area, this interface forming a fluid-tight seal between the plug and the extension tube. Plug 27 further includes a central bore 33 which terminates at an end cap 35 forming the end of plug 27.

A small L-shaped steel tube 37, which can be a refrigerant capillary tube, extends through cap 35 to bore 33. A vertical leg 39 (FIG. 3) of tube 37 is of sufficient length to effect communication of bore 33 with the ambient air when plate fin coil 1 is immersed to the extent required for the ultrasonic soldering process.

In operation, when the plate fin coil is immersed in ultrasonic solder bath 5 as described herein, the interior of the refrigerant circuit communicates with the ambient air to provide the desired pressure relief, whereby the interior of the circuit is at ambient pressure. The problems associated with a buildup of air pressure within the circuit as described previously is thereby avoided.

In use, process snorkels 13 are assembled to extension tubes 29 by press-fitting each plug 27 into the theretofore uniform end 29 of each tube 21. This pressing operation forms a bell in extension tube 21, this bell being functional for connecting the tube to another portion of a refrigeration system after the process snorkel is removed. Thus, the assembly of the removable process snorkel saves a subsequent manufacturing step. Upon completion of the ultrasonic soldering process, each extension tube 21 and plug 27 are heated to facilitate the removal of the process snorkel from the extension tube. The solder does not impair the removal of the snorkel from the extension tube, since the material from which the former is fabricated is not compatible with the solder, so that the adherence between the materials is very low. The process snorkel can then be reused with another plate fin coil.

Process snorkels 13 have conveniently low masses, and they do not significantly affect the pre-heating process prior to the ultrasonic soldering process in an adverse manner.

The venting apparatus described herein fulfills the objects of the present invention. The apparatus effectively relieves the pressure in the circuits of plate fin coils when portions of the coils are immersed in molten solder during an ultrasonic soldering process. Snorkels 13 are reuseable and are very compatible with mass production techniques. Since there is no cutting operation involved in the use of process snorkels 13, the disadvantages of the presence of copper chips are avoided. There are no complicated fixtures or related apparatus required for inserting process snorkels 13 into the extension tubes described above. Process snorkels according to the invention are susceptible of inexpensive manufacture and are very easy to use.

The invention has been described in detail with particular reference to the preferred embodiment of the invention. But variations and modifications within the spirit and scope of the invention may occur to those skilled in the art to which the invention pertains.

I claim:

1. A process for relieving the interior air pressure of a heat exchanger fluid circuit of a heat exchange coil during a soldering operation, the circuit including a plurality of heat exchange tubes having open ends connected by return bends prefitted over the open ends and the circuit terminating in open-ended tubular members having an inner surface, wherein the return bends prefitted on the open ends of the heat exchange tubes of the circuit are immersed in the bath of molten solder, the process comprising the steps of:

inserting the plug member of process snorkels into the open ends of the tubular members; the plug members formed of a material incompatible with the solder in the solder bath for inhibiting the adherence of solder to said plug members including outer configurations dimensioned to enable the plug members to telescope into the open-ended tubular members terminating the circuit in sliding engagement with the inner surfaces of the tubular members, a forward surface exposed to the interior of the circuit when the plug member is telescoped into the open end of the tubular member, a bore extending from said surface into the plug member, and a tubular member extending from the bore, the tubular member being dimensioned to place the bore in communication with the atmosphere when the circuit is immersed in the solder bath;

expanding the ends of the tubular members by forcibly assembling the plug members having a greater outside diameter than the inside diameter of the tubular members such that a portion of each tubular member assumes the configuration of the respective plug member, said step of expanding occurring simultaneously with the step of inserting the plug member;

immersing the portion of the heat exchange coil having the open ends of the heat exchange tubes with the prefitted return bends, and the open-ended tubular members with the inserted process snorkels, into the solder bath, the process snorkels relieving the internal pressure in the circuit enabling the molten solder to flow into the joints between the heat exchange tubes and return bends;

removing the immersed portion of the heat exchange coil immersed from the solder bath; and removing the process snorkels from the tubular members.

* * * * *